(12) United States Patent
Pesonen et al.

(10) Patent No.: US 11,768,269 B2
(45) Date of Patent: Sep. 26, 2023

(54) POSITIONING BASED ON SIGNAL PROPAGATION TIME DIFFERENCE

(71) Applicant: EXALOCUS OY, Espoo (FI)

(72) Inventors: Erkki Pesonen, Helsinki (FI); Jukka Heikkonen, Espoo (FI)

(73) Assignee: EXALOCUS OY, Espoo (FI)

( * ) Notice: Subject to any disclaimer, the term of this patent is extended or adjusted under 35 U.S.C. 154(b) by 162 days.

(21) Appl. No.: 17/423,574

(22) PCT Filed: Jan. 16, 2020

(86) PCT No.: PCT/FI2020/050026
§ 371 (c)(1),
(2) Date: Jul. 16, 2021

(87) PCT Pub. No.: WO2020/148485
PCT Pub. Date: Jul. 23, 2020

(65) Prior Publication Data
US 2022/0171015 A1 Jun. 2, 2022

(30) Foreign Application Priority Data
Jan. 18, 2019 (FI) ...................................... 20195031

(51) Int. Cl.
*G01S 5/06* (2006.01)
*G01S 5/10* (2006.01)
(Continued)

(52) U.S. Cl.
CPC .............. *G01S 5/06* (2013.01); *G01S 5/0081* (2013.01); *G01S 5/02216* (2020.05); *G01S 5/10* (2013.01)

(58) Field of Classification Search
CPC ...... G01S 5/06; G01S 5/02216; G01S 5/0081; G01S 5/10
(Continued)

(56) References Cited

U.S. PATENT DOCUMENTS

| 4,318,105 A | 3/1982 | Brodeur |
| 6,054,950 A | 4/2000 | Fontana |

(Continued)

FOREIGN PATENT DOCUMENTS

| CN | 106152882 A | * 11/2016 | ................. F41J 5/04 |
| CN | 109085789 A | * 12/2018 | |

(Continued)

OTHER PUBLICATIONS

International Search Report for PCT/FI2020/050026, Prepared by the Finnish Patent Registration Office, dated Apr. 22, 2020, 5 pages.

*Primary Examiner* — Harry K Liu
(74) *Attorney, Agent, or Firm* — BROOKS KUSHMAN PC; John E. Nemazi

(57) ABSTRACT

A positioning method, as well as the system of base stations (T1,T2,T3) and detector (I) is based on measuring the propagation time difference of externally controlled electromagnetic pulses (F1,F2,F3) and the arrival signals of the controlled base station during a measurement cycle (t1+t2). In one embodiment, a reference clock is not required for measuring propagation time differences, but instead, accurate fixed distances between base stations can be used as a reference. System calibration is rarely performed. It checks the mutual locations of base stations. This may be partially automated. The positioning system does not require any sensors.

15 Claims, 2 Drawing Sheets

(51) Int. Cl.
*G01S 5/02* (2010.01)
*G01S 5/00* (2006.01)

(58) Field of Classification Search
USPC .......................................... 342/463
See application file for complete search history.

(56) References Cited

U.S. PATENT DOCUMENTS

| | | |
|---|---|---|
| 10,274,580 B2 | 4/2019 | Vazhenin et al. |
| 2008/0103496 A1 | 5/2008 | Christopherson et al. |
| 2013/0337835 A1 | 12/2013 | Choi |
| 2018/0027421 A1 | 1/2018 | Chrabieh |
| 2018/0045807 A1* | 2/2018 | Senna .................. G01S 13/878 |

FOREIGN PATENT DOCUMENTS

| | | | |
|---|---|---|---|
| CN | 111193997 B | * 10/2021 | ............ H04J 3/0661 |
| GB | 2016851 A1 | 9/1979 | |
| WO | 17063271 A1 | 4/2017 | |
| WO | 2017204673 | 11/2017 | |

* cited by examiner

POSITIONING BASED ON SIGNAL PROPAGATION TIME DIFFERENCE

CROSS-REFERENCE TO RELATED APPLICATION

This application is the U.S. national phase of PCT Application No. PCT/FI2020/050026 filed on Jan. 16, 2020, which claims priority to FI Patent Application No. 20195031 filed on Jan. 18, 2019, the disclosures of which are incorporated in their entirety by reference herein.

TECHNICAL FIELD

One embodiment described relates to a positioning method, a system, and base stations and detector thereof.

BACKGROUND

Positioning in general may refer to identifying location of a person, vehicle or other moving object, such as a detector device. Known positioning systems based on electromagnetic radiation, such as radio waves, are used for measuring amplitude change, phase identification, or time measurement, which time measurement requires continuous time calibration and a reference clock. These are relatively complex arrangements which require performance and power from the system.

Publication US20050282558 discloses such a positioning system using a complex arrangement. It requires a carrier modulated detection signal. A dedicated master base station measures and maintains the calculation of time signals. Each base station must have a transmitter and receiver as well as a number of loops which are used for calculation.

SUMMARY

This summary has been elaborated in order to present a selection of concepts in simplified form, which are further described below in the detailed description. This summary is not intended to identify the essential or decisive features of the subject matter as defined in the claim, nor is it intended to limit the scope of the subject matter specified in the claim.

The object is to achieve a positioning method, system, and base station, and a detector. The objects are achieved by the features of the independent claims. The dependent claims describe some embodiments.

According to one aspect, the positioning method is based on measuring the propagation time difference of the controlled electromagnetic pulses and the arrival signals of the controlled base station during a measurement cycle. This detector can measure the propagation time difference of electromagnetic pulses received from base stations during a measurement cycle. The detector determines the position information of the base stations. Based on these, the position of the detector relative to the base stations can be determined. In one embodiment, a reference clock is not required for measuring propagation time differences, but instead, accurate fixed position information of base stations can be used as a reference. System calibration is rarely performed. It checks the mutual locations of base stations as well as delays in transmission and reception of radio signals. This may be partially automated. In particular, the system may not need any identifiers or IDs for location, but may instead operate directly on the basis of time difference between simple electromagnetic pulses and the position information of these base stations. No special identification signal is required. Positioning can be done directly in the detector without the need for a separate external calculation device. For this, the detector only needs these propagation time differences as well as the positions of the base stations.

In one embodiment, in addition to the above, or alternatively, the base stations can operate in any frequency band of electromagnetic radiation, thereby always being able to select the most appropriate permitted frequency band for the operating situation. In one embodiment, a frequency band may have multiple frequencies in use.

In one embodiment, in addition to the above, or alternatively, one base station controls other base stations, or all base stations are controlled externally thereof, or an external clock controls all base stations so that repetitive transmission periods in the detector do not overlap in time.

In one embodiment, in addition to the above, or alternatively, reference clocks are not required for measuring propagation time of electromagnetic pulses, but instead, the mutually calculated position information of the base stations are used as references.

In one embodiment, in addition to the above, or alternatively, the propagation times of electromagnetic pulses from the base stations to the detector are synchronized on the token ring principle.

In one embodiment, in addition to the above, or alternatively, the calculation of the results in the detector is based on solving a group of equations, for example, based on the maximum likelihood, considering as variables the distances between base stations and the detector as well as propagation time differences.

In one embodiment, in addition to the above, or alternatively, the position information can be transferred from each location object to an object external thereof by IoT methods.

In one embodiment, in addition to the above, or alternatively, the position information may be calibrated by separate transmitters R, which are placed in accurately measured locations and which are immediately recognized by the locating detector as it arrives at the location of R.

In one embodiment, in addition to the above, or alternatively, the positioning method is equally suitable for indoor and outdoor positioning. Positioning can take place in 1, 2, or 3 dimensions. The positioning dimension is selected by the number of transmitters.

In one embodiment, in addition to the above, or alternatively, the reliability of the positioning method can be increased by adding base stations to the positioning area.

In one embodiment, in addition to the above, or alternatively, an unlimited number of separate detectors can be simultaneously used in the positioning area.

Several related features will be more readily illustrated as they become more fully understood by reference to the following detailed description, which will be considered in connection with the accompanying figures.

DESCRIPTION OF THE FIGURES

The present description will be better understood from the following detailed description, which will be considered in the light of the accompanying figures, in which.

Corresponding references are used to designate corresponding parts in the accompanying figures.

DETAILED DESCRIPTION

The detailed description given in connection with the figures below is intended as description of the present embodiments and is not intended to represent the only possible forms in which the present example may be constructed or utilized. However, corresponding or equivalent functions and structures may be implemented by various examples. The description refers to the following drawings, which use, as an example, positioning of a detector based on propagation time difference of signals transmitted from base stations.

Figure 1:
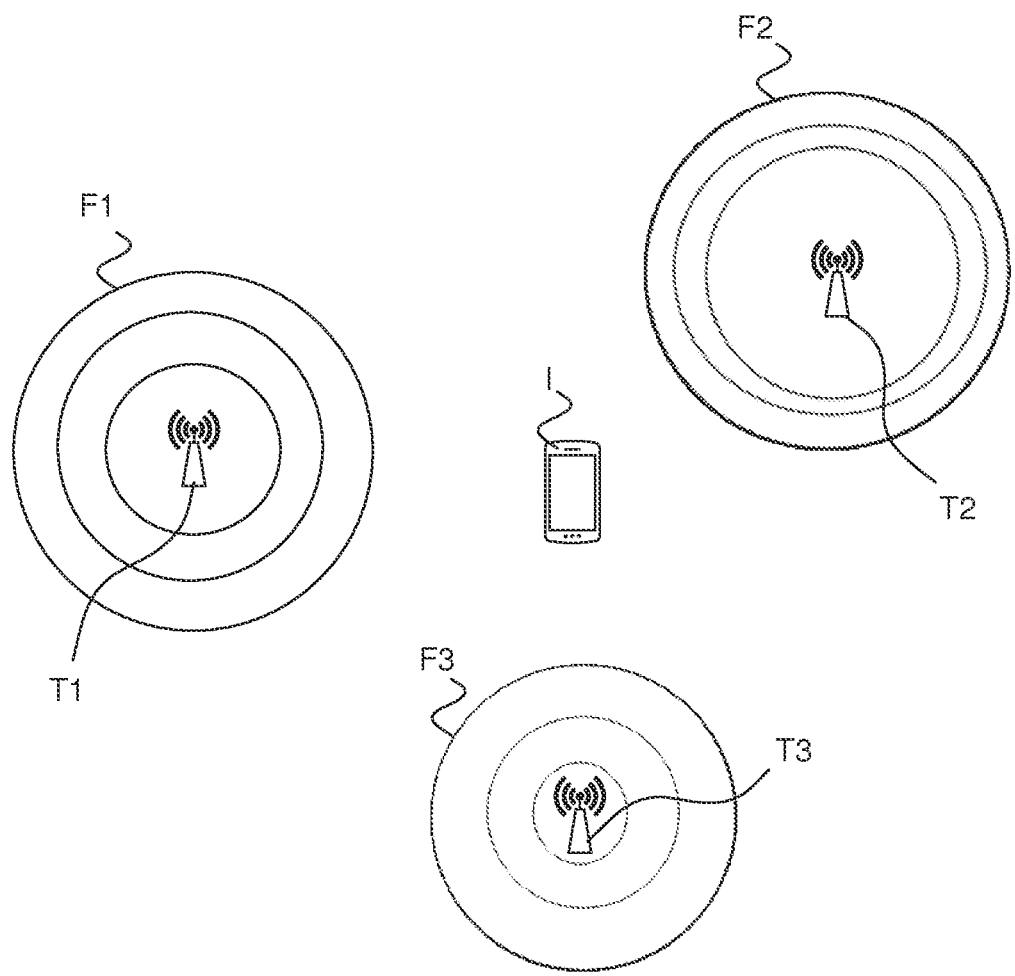
FIG. 1 illustrates a block diagram of a positioning system in which the detector detects the propagation time difference of electromagnetic radiation transmitted by base stations as well as positions according to one embodiment.

Referring to FIG. 1, the positioning system is composed of base stations T1, T2, T3 and detectors I. The base stations T may be transmitters or corresponding devices. Base stations T also have a receiver as required, depending on its role in the positioning system. The detector I may be depicted as objects, receivers or corresponding positioning devices. The detector I may have a transmitter as required, depending on the positioning system configuration and the role of the detector I in it. The detector I either recognizes its own position, or the position of the detector I is recognized externally thereof. The system operates as well indoors as outdoors and the detectors I can remain stationary or move.

In one embodiment, the positioning is based on time difference measurement of electromagnetic pulses F1, F2, F3, such as for example radio waves, signals thereof, etc., originating from externally controlled base stations T, from synchronized arrival signals during a measurement cycle. The electromagnetic pulses F can be generated, for example, from either interrupted carrier waves or from signals modulated to carrier waves. For calibration are used fixed mutual distances of base stations T and on the basis of this known position information.

Radiocommunication takes place, by at least partly automatically controlled, base stations T and receiver I pairs. The frequency band can be defined on a case-by-case basis so that interference from the operating environment is reduced and reliability is increased.

The number of base station T units is selected depending on whether the positioning is in 1, 2 or 3 dimensions. By increasing the number of base stations T on a case-by-case basis, the reliability of position calculation measurements can be maintained at high level even in difficult circumstances.

As such, the number of detectors I in the positioning area is not limited. Thus, the number of objects to be located is not limited. In an embodiment, the time calibration relating to positioning is solved by using a measurement cycle. A suitable active time during which positioning signals operate and a silent time during which no signals are used may be used in the measurement cycle. This is to ensure that the system does not interfere with its own signals.

Compared to prior positioning methods, independence from time calibration releases the positioning system of the embodiment from expensive and cumbersome reference clocks that are typical of known positioning techniques, e.g. in positioning systems based on propagation time measurement of pulses.

Positioning can be done directly in the detector without the need for a separate external calculation device. For this, the detector only needs these propagation time differences as well as the positions of the base stations. There is no need for the previously used separate positioning center, which communicates with the base stations and the device which is located.

In one embodiment, the data for location calculation is obtained by repeating the positioning system measurement cycle a sufficient number of times. This can increase reliability and accuracy of positioning. Because the measurement cycle can be repeated in a very fast period of time, which is almost imperceptible for human being, it does not bother the user.

The accuracy of the positioning system does not significantly change as a function of the size of the positioning area, as is the case with known positioning systems based on measurement of signal incidence angle.

Some applications for the embodiments include container ports, in particular control of manual and autonomous forklift traffic, and accurate positioning of containers in loading situations, department stores and airports. Of course, these are mainly described examples and are not intended to limit the scope of the embodiments to those examples or similar embodiments only.

Autonomous transport, ships and cars, for example, require accurate position information. Ships entering and leaving the harbor, and cars on the road, parking and commuting. The positioning system according to the embodiment is easy to set up in ports or alongside roads. Only one system is sufficient for ports, and from it, a positioning network can be built alongside roads.

The operation of one embodiment will now be illustrated.

For example, base stations T at fixed locations transmit either a pulse sequence or a carrier modulated signal. The transmission is controlled from one base station T, whereby the transmission sequence, i.e. the measurement cycle, is complete once the signals of all the transmitters have arrived at the detectors I. A new instruction is then given to the next transmission sequence. Alternatively, the transmission is controlled externally of the base stations T from object A, to which the positions of the detectors I are read after each full measurement sequence. Alternatively, all base stations T are aware of each other and repeat the measurement sequence each time all base stations T have once transmitted their signals to detectors I.

Figure 2:
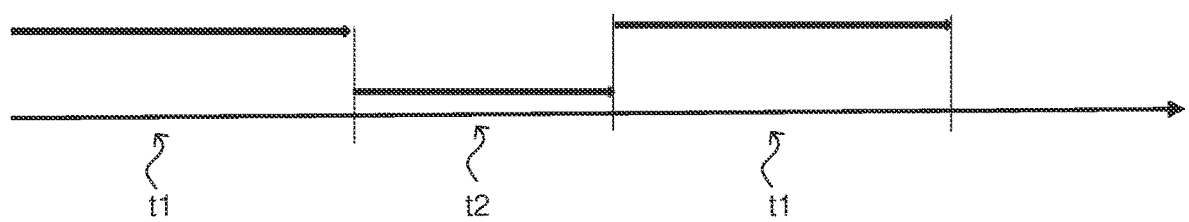
FIG. 2 illustrates transmission according to an active period t1 of a measurement cycle t1+t2 and non-transmission of a silent period t2 according to one embodiment.

One embodiment according to FIG. 1 is considered, wherein three base stations T are in use. One of these base stations T1 is the so-called master and the other are slaves T2, T3. The master base station T1 has a minimum configuration of only a transmitter and the slave base stations T2, T3 have both a receiver and a transceiver. In the general case, the master base station T1 also has both a transmitter and a receiver. The object to be located, i.e. the detector I, has only a receiver at minimum. Radiocommunication in a positioning system according to an embodiment consists of automatically controlled radio bursts F transmitted by base stations T consisting of an identification frequency transmitted at a preselected frequency for a time window t1 and non-transmission for a time window t2. This measurement cycle, i.e. the operating cycle (transmission/non-transmission), is repeated as long as the base stations T of the positioning system operate. Each base station T thus functions as a "Morse telegraphy device". In this case, the actual "code" or id is not required for the electromagnetic signal. Sure, it can be used, but it is not necessary for positioning action. FIG. 2 illustrates transmission according to active time t1 and non-transmission according to silent time t2. During active time t1, positioning transmissions F are enabled and during silent time t2, those transmissions F are disabled. This ensures that transmissions F are not interfered in the positioning process at detector I or at slave base stations T2 and T3. The measurement cycle is t1+t2.

Positioning begins when slave T2, T3 and master T1 base stations are started. It is not as such important in which order the base stations T are started since slave base stations T2, T3 are waiting for the radio base burst signal F1 of master base station T1 of length t1 at a predetermined frequency. Because the slave base stations T2, T3 act as transceivers or repeaters in the positioning system, they wait to detect the burst F1 transmitted by the master base station T1 and simultaneously transmit the radio burst F2, F3 forward on the same or their own radio frequency (using multi-channel wide or narrow band technology). In the slave base stations T2, T3, there is always a deterministic time delay Δt between the received master burst F1 and the transmitted burst F2, F3, which time delay Δt can be determined during the system calibration step. It should be noted that the slave base stations T2, T3 do not require any programmatic detection of burst F1, but the detection can be carried out directly with fast and simple components (for example, so-called trigger detection). Of course, one can even build a radio transmitter specified for each base station T, based on a fixed frequency crystal oscillator, or use a ready-made high-speed radio transmitter circuit (e.g., 460 MHz to 2.3 GHz) for which the frequency and length of the transmitted burst F is set. The base stations T as a whole are controlled by fast logic gates or even by a fast microcontroller. Sufficient power amplification is performed before the antenna. The time required for the base station T2, T3 to reproduce the burst F2, F3, as previously described in an embodiment, can be determined during the system calibration step.

In one embodiment, the detector I to be positioned consists of a multichannel receiver which receives the bursts F1, F2, F3 of master T1 and slave T2, T3 base stations at each instant. In this case, the time delay between bursts F1, F2 and F3 may not be necessary as they may operate at different frequencies. In another embodiment, the detector I operates at a single frequency, whereby a deterministic delay between transmissions F of base stations T can be used to eliminate the overlap of signals F1, F2 F3, so that bursts F1, F2 F3 do not mutually interfere. When the difference in the arrival time differences of the bursts F1, F2, F3 from master T1 and slave T2, T3 base stations and the locations of the three base stations T1, T2, T3 are known, the position of the object I to be located can be determined by calculation.

The operation of the positioning system described above for both master T1 and slave T2, T3 base stations and the detector I to be located is a simple scenario. In a general case, all base stations T, including the master base station T1, have both a transmitter and a receiver, and the numbers of base stations T and objects I to be located are not limited and the shape and size of the positioning area are freely selectable. Also, the pulses F of the transmitted pulses, the transmission times, and the structure of the transmitted pulse packet are freely selectable, as long as they meet the licensing requirements governing radio communications.

Next, the operation of radio communication F in one embodiment will be considered. In one embodiment, all base stations T have both a transmitter and a receiver. The transmitter of the base station T controls the electromagnetic pulses F selected within the range of 500 μs to 100 ps depending on the application. Power is adjusted according to the size of the positioning area, keeping in mind national and international regulations governing radio communications. The antennas can be omnidirectional and the receivers specified for all transmission frequencies.

The transmitter of the base station T can transmit a carrier wave modulated signal. Modulation is synchronized between different transmitters so that detector I recognizes the signals received from each base station T.

An embodiment illustrates, by way of example, the token ring principle for synchronizing base station transmissions where the object I to be located identifies its location. Markings: Fi is the frequency of the outgoing signal, Ti is the base station T whose transmission frequency is Fi, xj is the detector I to be located. Sub-indices are consecutive natural numbers. The measurement cycle t1+t2, Δ, of the base station T is the pulse packet duration t+delay δ. δ is the wake-up time of the transmitter+a preset wait time. The measurement period is the event where all possible measurement cycles have occurred between the base stations T. The radio pulses Fi are transmitted from the fixed base stations Ti to the detectors I. The distances between the base stations T are known precisely by the location of the base stations T. The pulse from the base station Ti is recognized by the detectors and only the base station Ti+1, the pulse from the base station Ti+1 is recognized only by the detectors Ii and the base station Ti+2, etc. One of the base stations is the start station T1. The positioning process will be started from it. Starting is done either automatically or by command.

Each base station T transmits unique frequency Fi for a time t1 and does not transmit for a time t2. The duration of the pulse packet, i.e. the measurement cycle, is t1+t2. The receiver I of the object to be located recognizes the measurement cycle and the length of the transmit cycle window of the base stations T, which is (n+1) (t1+t2)+nδ, where n=a known integer which is the number of base stations −1.

The measurement cycle is pre-programmed at base stations T and detectors I. It is recognized such that the base station Ti+1 recognizes the frequency Fi and after the time t1+t2+δ the same frequency Fi (pulse Fi transmitted by the base station Ti) and transmits the pulse Fi+1 to the base station Ti+2, which recognizes it, etc.

In the case where the base station T2,T3 is able to recognize only one frequency at a time, the base stations T operate so that the next base station T starts transmitting only after the last measurement period of the previous station has ended.

In the case where the base station T2,T3 is able to simultaneously recognize several frequencies, the base stations T operate so that immediately upon recognizing the measurement cycle which they receive, the base station T starts transmitting at its own frequency F its own measurement cycle. Thus, the receiver recognizes almost simultaneously the measurement cycles transmitted by each base station T and the pulse packets F resulting from these.

Our positioning system may include several objects I at the same time, each of which receives accurately its position information, whether they are moving or in place. Each object I has a similar position indicator. Positioning is thus similar to GPS, but much more accurate in both horizontal and vertical directions.

In one embodiment, short duration pulses F are generated in selected frequency band. They are transmitted from time window t1. Reception of pulses F sent in pre-programmed manner. Monitoring of timings, structure of pulses and interference signals.

The location of the object's detector I can also be recognized externally thereof. Here, the detector I can be located inversely by inverse synchronization, wherein the detector I synchronizes the base station T1. The detector I is a synchronizer and one of the base stations T1 performs the calculation. At the beginning of the measurement cycle, the detector (i.e., the object to be located) I transmits a signal which is received by the base stations T1, T2, T3, . . . , Tn. One of these base stations, e.g. T1, may serve as a location calculation unit, which may mean that T1 does not transmit any signal forward. Instead, the other base stations Ti, i=2, . . . , n transmit the signal forward when they first receive the signal from detector I. When the signals from these base stations Ti, i=2, . . . , n finally arrive at T1, T1 can calculate the signal arrival time differences from the signals arrived from base stations Ti, i=2, . . . , n compared to the signal arrived from detector I, and base station T1 can calculate the location of the detector i.e. the object. That is, the detector I operates as the object to be located.

Thus, the inverse system according to the embodiment operates simply so that instead of the detector I calculating its own position, one of the base stations, in the example above T1, calculates the position, and this base station thus operates in the same manner as the detector I in the normal application, and in the inverse solution the detector I in the same manner as in the normal situation the base station providing the first signal operates at the beginning of the measurement cycle. The position can be calculated at that base station only on the basis of propagation time differences of a simple signal and the location of the base stations. Special computing center or other communication between the base stations and any computing center is not required.

The master base station T1 can have only a transmitter and the other base stations T2, T3 have both a transmitter and a receiver. This is the simplest configuration. In it, the master base station T1 controls, for example via cables, slave transmitters T2, T3.

When the base station T1 transmits the signal F1 to the detector I, it also sends an instruction F1 to slave base stations T2,T3 to transmit the signal F2,F3 to the detector I. The transmission periods are controlled such that a new period arrives at the detector I only after the previous period has been processed in the detector I. This is repeated for each measurement point until statistically complete data is available to calculate the position. Exactly as much data can be collected to locate each point.

The reception, measurement cycle, calculation, recording and display of pulses F1,F2,F3 may take place for example according to the following embodiment. Opening the active time t1 of the measurement cycle. Receiving and detecting n successive pulses F. n is a preset constant. The triggering time of the received pulse F is less than 1 ns. Deducing when all n pulses have been received. Closing the active time t1 for the silent time t2 of the measurement cycle. Exporting a sample for calculation. It is known that the next sample arrives from the next transmitter T2,T3. Opening the active time t1 after a predetermined silent time t2. Rotating the calculation sequences m times. Exporting results for calculation.

The following describes the use of propagation time differences of signals F in positioning calculation according to one embodiment.

Let the base stations be named T1, T2, . . . Tn. If 3D position information is needed, then the number of base stations T should be at least 4 or greater (i.e., n>=4). The coordinates of all base stations T are known as $Ti=(X_i,Y_i,Z_i)$, i=1, . . . , n. Let the object to be located be I=(X,Y,Z).

Assume next that the base station T1 is a so-called master base station which transmits a signal to other base stations T2, . . . , Tn and detector I. When the detector I receives a signal F1 transmitted by T1, a clock starts at the object. As signal F1 circulates from other base stations T2,T3 and upon arrival at detector I, detector I calculates an arrival time difference between signals received from T1 and other base stations T2, T3, Tn. Note these time differences $dt1i$, i=2, . . . , n. Thus, the number of time differences obtained is one less than the number of base stations T in use. For example, if there are four base stations T, then 3 time differences dt12, dt13 and dt14 are obtained in the object P to be located.

Suppose that there is no delay in the transmission of the signal F of the base stations T and that the propagation speed of the signal F is v. Then the signal propagation distances corresponding to each time difference $dt1i$, i=2, . . . , n can be calculated:

$$s12+s2I-s1I=v*dt12$$

$$s13+s3I-s1I=v*dt13$$

$$\dots$$

$$s1i+siI-s1I=v*dt1i$$

In the set of equations, $s1i$ corresponds to the distance from base station T1 to other base stations Ti, i=2, . . . , n, and these distances are known because the locations of the base stations are known. The variable $siI$, i=2, . . . , n is the distance from the base station Ti to the detector I=(X,Y,Z) to be located, and correspondingly $s1I$ is the distance of the base station T1 to the detector I. Thus, the following group of equations has three unknowns (X,Y,Z), and if i>=4, the coordinates (X,Y,Z) of the object can be solved, for example, by the method of maximum likelihood.

Each area or device value shown here may be expanded or changed without losing the effect and effectiveness sought. In addition, any embodiment or feature may be combined with another embodiment unless explicitly denied.

Although the subject matter is described using particular structural features and/or functions, it is to be understood that the subject matter as defined in the appended claims is not necessarily limited to the specific features or functions described above. Rather, the specific features and functions described above are exemplified by the implementation of the requirements, and equivalents of other such features and functions are intended to be within the scope of protection.

It is to be understood that the benefits and advantages described above may relate to one or more embodiments. The embodiments are not limited to those that solve any or all of the identified problems or those that have any or all of the stated benefits and advantages.

The process steps described herein can be carried out in any convenient order, or simultaneously, if necessary.

In addition, individual steps may be removed by any method without departing from the spirit and scope of the subject matter as described herein. The aspects of the examples described above can be combined with those of any other example without losing the desired effect.

The term "comprising" is used herein to mean including identified methods, blocks or elements, but that such blocks or elements do not include exclusive list, and the method or device may include other blocks or elements.

It is to be understood that the above description is given by way of example only, and that various modifications may be made by one skilled in the art. The above description, embodiments, and data provide a comprehensive description of the structure and the use of certain embodiments. Although various embodiments have been described above with a particular feature, or by reference to one or more individual embodiments, those skilled in the art can make numerous changes to the embodiments shown without departing from the spirit or scope of this disclosure.

The invention claimed is:

1. A positioning method comprising:
   measuring at a detector propagation time difference of radio frequency electromagnetic pulses received from base stations during measurement cycle;
   defining the detector position information of the base stations; and
   determining in the detector, on basis of the propagation time difference and the position information, a position of the detector relative to the base stations, wherein the base stations are connected to each other via cables, wherein transmission of said radio frequency electromagnetic pulses from base stations is controlled via said cables, wherein calibrated position information of the base stations and calibrated distances between them are used as references for measuring the propagation time difference of the radio frequency electromagnetic pulses, wherein calibrated delays in transmission and reception of radio signals of the radio frequency electromagnetic pulses are used, and wherein reference clock of the base stations is not required for measuring the propagation time differences.

2. The positioning method according to claim 1, wherein radio transmitters of the base stations are configured to operate in a wide frequency band of the radio frequency electromagnetic radiation including a plurality of usable frequencies, wherein a specific frequency band is configured for the operating situation.

3. The positioning method according to claim 1, wherein one base station is configured to control other base stations, or all base stations are controlled externally thereof, or an external clock controls all base stations according to a measurement cycle;
   wherein transmission periods repeated in the detector do not overlap in time.

4. The positioning method according to claim 1, wherein the propagation times of the radio frequency electromagnetic pulses transmitted from the base stations to the detector to be located are configured to be synchronized based on a token ring communications.

5. The positioning method according to claim 1, wherein the detector is adapted to determine its own position:
   by determining the propagation time difference on the basis of a first received radio frequency electromagnetic pulse and subsequently received radio frequency electromagnetic pulses;
   to determine, based on the propagation time difference and the positions of the base stations, propagation distance of the radio frequency electromagnetic pulses; and
   to determine the position of the detector based on the propagation distances.

6. The positioning method according to claim 5, wherein the position information of the position of the detector can be transferred from each location object to an object external thereof by means of internet-of-things communications.

7. The positioning method according to claim 1, wherein the position information can be calibrated by separate base stations placed at accurately measured locations, which are immediately recognized by the positioning detector as it arrives at the location of the base station.

8. The positioning method according to claim 1, wherein the calibration is performed by a remote sensor which is programmed or permanently stored with coordinates of a location where the remote sensor is permanently installed.

9. The positioning method according to claim 1, wherein the positioning is applicable to both indoor and outdoor positioning.

10. The positioning method according to claim 1, wherein the positioning dimension, in the 1, 2 or 3 dimension, is selected by the number of base stations (T1,T2,T3).

11. The positioning method according to claim 1, wherein the positioning reliability can be increased by adding base stations in a positioning area.

12. The positioning method according to claim 1, wherein a plurality of detectors can be used simultaneously in a positioning area.

13. A positioning method, comprising:
   measuring at one base station propagation time difference of radio frequency electromagnetic pulses received from the other base stations and a detector during a measurement cycle;
   defining position information of both the one base station and the other base stations; and
   determining at the base station, based on the propagation time difference and the position information, a position of the detector relative to the base stations, which base stations are connected to each other via cables, wherein transmission of said electromagnetic pulses from the base stations is controlled via said cables, wherein calibrated position information of the base stations and calibrated distances between them are used as references for measuring the propagation time difference of the radio frequency electromagnetic pulses, wherein calibrated delays in transmission and reception of radio signals of the radio frequency electromagnetic pulses are used, and wherein reference clock of the base stations is not required for measuring the propagation time differences.

14. A detector, configured to:
   measure propagation time difference of radio frequency electromagnetic pulses received from base stations within a predetermined time period;
   determining distances of the base stations relative to each other; and
   determining position information of a detector on a basis of the propagation time difference and the distances, wherein the base stations are connected to each other via cables, wherein transmission of said electromagnetic pulses from the base stations is controlled via said cables, wherein calibrated position information of the base stations and calibrated distances between them are used as references for measuring the propagation time difference of the radio frequency electromagnetic pulses, wherein calibrated delays in transmission and reception of radio signals of the radio frequency electromagnetic pulses are used, and wherein reference clock of the base stations is not required for measuring the propagation time differences.

15. A base station configured to:
   measure a propagation time difference of radio frequency electromagnetic pulses received from other base stations and a detector during a measurement cycle;
   determine position information of the base stations; and
   determine, based on the propagation time difference and the position information, a position of the detector relative to the base stations, which base stations are connected to each other via cables, wherein transmission of said electromagnetic pulses from the base stations is controlled via said cables, wherein calibrated position information of the base stations and calibrated distances between them are used as references for measuring the propagation time difference of the radio frequency electromagnetic pulses, wherein calibrated delays in transmission and reception of radio signals of the radio frequency electromagnetic pulses are used, and wherein reference clock of the base stations is not required for measuring the propagation time differences.

\* \* \* \* \*